Patented Apr. 7, 1925.

1,532,226

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCT OBTAINED THEREBY.

No Drawing. Original application filed April 1, 1922, Serial No. 548,826. Divided and this application filed April 1, 1922. Serial No. 548,828.

*To all whom it may concern:*

Be it known that I, SIDNEY M. CADWELL, a citizen of the United States, residing at Leonia, county of Bergen, and State of New Jersey, have invented certain new and useful Improvements in Processes for Vulcanizing Rubber and Products Obtained Thereby, of which the following is a full, clear, and exact description.

This invention relates to vulcanizing rubber and similar materials and products obtained thereby, being more particularly directed to acceleration of vulcanization by a class of organic accelerators and products resulting from such vulcanization.

This case is a division of application Serial No. 548,826 now issued as Patent No. 1,440,962 filed April 1, 1922.

One object of the invention is to provide a process of the kind mentioned employing accelerators obtainable from inexpensive raw materials by a simple method. Another object of the invention is to provide a process in which accelerators of the kind mentioned may be readily compounded with rubber, or similar material, which shall permit of the carrying out of vulcanization at ordinary temperatures, in masses of rubber or in thin sheets, while avoiding the generation of acids during the process of vulcanization, as, for example, takes place when sulphur chloride is used. Another object is to provide a series of products having generally desirable physical characteristics, such as high tensile strength, resistance to ageing, resistance to flexing, etc., and which shall be substantially free from the odor of the vulcanizing ingredients employed. Other objects will in part be obvious and in part pointed out hereinafter.

The invention accordingly consists broadly in the process, and product obtained therefrom, for treating rubber and similar materials, which comprises subjecting the rubber to a vulcanizing agent and a substance containing the radical $$\underset{X}{\overset{\parallel}{RCSM,}}$$

and vulcanizing the rubber. In this formula, R represents any element subject to the limitation mentioned hereinafter; M represents a salt-forming element or group or hydrogen, such as zinc, ammonium, etc., and is designated as representing a metal or being metallic, or a radical $$\underset{X}{\overset{\parallel}{SCR}}$$

or a radical $$\underset{X}{\overset{\parallel}{CR;}}$$

and X represents any bivalent element or radical, such as sulphur, oxygen, etc., subject to the limitation mentioned later.

It will be seen that the substances containing the radical fall into three groups corresponding to the three said significations of M. In the first two groups the symbol R in $$\underset{X}{\overset{\parallel}{RCSM}}$$

is limited to any element except nitrogen; in the third group where M represents $$\underset{X}{\overset{\parallel}{CR}}$$

this limitation is absent. In the table herein shown forming part of the specification, there is shown the broad group containing the radical

sub-divided into three smaller groups which are respectively

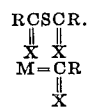

It will be noted that the group formulæ represent generally derivatives of carbon oxysulphide or carbon disulphide.

The formulæ of the first two groups mentioned, in which the first symbol R is any element except nitrogen, may be written

under which fall

where M is the metal and thiol salts are included, and

where M is equal to

and the disulphides are represented. R' in these formulæ designates any element except nitrogen.

In employing the first group of those mentioned above including substances having the formula

it has been found that M preferably represents either zinc or mercury in the mercuric state when vulcanization at ordinary temperatures is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is

where M' represents one of the preferred metals given. M' may be substituted by any metal provided that one of the metals just mentioned is present in the combination either at some other position in the formula including

or be introduced otherwise than as part of this compound. In connection with the other groups mentioned, namely, those represented by the formulæ

and

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state.

As noted in connection with the first group, the metals employed in groups 2 and 3 may be present in any combined form.

In the table mentioned above, R and X are shown as represented by carbon, oxygen, nitrogen and sulphur, which are four of the more important elements occurring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:—

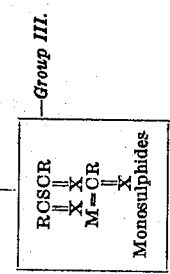
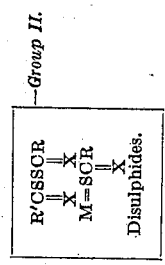
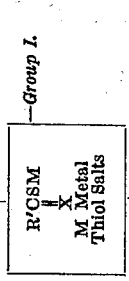

| 1. OCSM =S | 2. OCSM =O | 3. OCSM =NR | 4. OCSM =CH₂ |
|---|---|---|---|
| 5. CCSM =S | 6. CCSM =O | 7. CCSM =NR | 8. CCSM =CH₂ |
| 9. SCSM =S | 10. SCSM =O | 11. SCSM =NR | 12. SCSM =CH₂ |
| 13. NCSM =S | 14. NCSM =O | 15. NCSM =NR | 16. NCSM =CH₂ |

| 17. OCSSCO =S S | 18. OCSSCO =O O | 19. OCSSCO =NR NR | 20. OCSSCO =CH₂ CH₂ |
|---|---|---|---|
| 21. CCSSCC =S S | 22. CCSSCC =O O | 23. CCSSCC =NR NR | 24. CCSSCC =CH₂ CH₂ |
| 25. SCSSCS =S S | 26. SCSSCS =O O | 27. SCSSCS =NR NR | 28. SCSSCS =CH₂ CH₂ |
| 29. NCSSCN =S S | 30. NCSSCN =O O | 31. NCSSCN =NR NR | 32. NCSSCN =CH₂ CH₂ |

| 33. OCSCO =S S | 34. OCSCO =O O | 35. OCSCO =NR NR | 36. OCSCO =CH₂ CH₂ |
|---|---|---|---|
| 37. CCSCC =S S | 38. CCSCC =O O | 39. CCSCC =NR NR | 40. CCSCC =CH₂ CH₂ |
| 41. SCSCS =S S | 42. SCSCS =O O | 43. SCSCS =NR NR | 44. SCSCS =CH₂ CH₂ |
| 45. NCSCN =S S | 46. NCSCN =O O | 47. NCSCN =NR NR | 48. NCSCN =CH₂ CH₂ |

Group II.

Disulphides.

In general it is to be noted in connection with this group that its members are able to accelerate both hot vulcanization, that is, vulcanization at or above 240° F. and vulcanization below such temperatures and that they may be used for such vulcanization in thick masses of rubber, in thin sheets, or in cements.

The general procedure for vulcanizing employing members of this group is as follows: 100 parts rubber, 10 parts of zinc oxide, 3 parts of sulphur and 0.1–3.0 parts of the accelerator are mixed. If hot vulcanization is employed the usual temperature or lower may be used for periods of thirty minutes or more to complete vulcanization. The normal or usual temperatures for hot vulcanization are 240° F. or above. If cold vulcanization or vulcanization at lower temperatures than that employed for hot vulcanization is desired the mixed materials may be allowed to stand at ordinary room temperature for a week or less when vulcanization is complete. In connection with curing at ordinary temperatures, it is pointed out that such curing is effected in a slightly longer time than in connection with members of Group I, set forth in my copending application Serial No. 548,827, now issued as Patent No. 1,440,963, filed April 1, 1922.

The procedure given above may be employed with thin or thick masses of rubber and in the case of cements where a solvent is used with the mixture the procedure after mixing and evaporation of the solvent is substantially identical with that employed for thin masses of rubber. The group possesses the particular advantage that its members may be introduced into bulk rubber with practically no danger of prevulcanization or burning when milled. As pointed out above, a combined metal, preferably in the form of a metallic oxide such as zinc oxide, is employed in connection with members of this group. In general, the use of bases, particularly amines, is preferred in connection with members of this group. The oxides are generally designated as $M'_xO_y$, $M'$ having previously been defined.

The action of the addition of primary and secondary amines to materials of this class has been found to be as follows:—The acceleration by aliphatic amines is greatest when approximately three-quarters molecular weight of the amine on the basis of the carbon disulphide content of the compound is used. An excess of primary aliphatic amine retards the cure considerably. An excess of secondary aliphatic amine retards the cure less. The greater the amount of primary aromatic amine added, the greater the acceleration. Tertiary amines have substantially no effect. Dibenzyl amine has given excellent results in the acceleration of vulcanization according to the invention. Aniline has also given good results. Sodium hydroxide also accelerates the action of disulphides.

Species 17.

The following members of this species have been employed to give good results in connection with the process included in the invention:—

O—methyl thiocarbonic acid disulphide

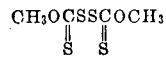

O—ethylthiocarbonic acid disulphide

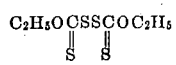

O—amylthiocarbonic acid disulphide

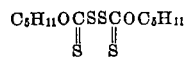

O—normal butyl thiocarbonic acid disulphide

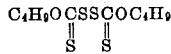

The above members are disclosed and claimed in co-pending application Serial No. 548,826, now issued as Patent No. 1,440,962, filed April 1, 1922.

Species 18.

The following member of this species has been employed to give good results in connection with the process included in the invention:—

Dibutyloxyester of carbonyldisulphide

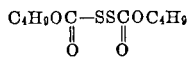

Species 21.

As an example of the specific procedure employing a member of this group, 100 parts of rubber, 10 parts of zinc oxide, 3 parts of sulphur, and 0.1 part thiobenzoyldisulphide are mixed by milling and vulcanization is accomplished by placing the material in a mold and subjecting to steam pressure at 40 lbs. per square inch for 30 minutes.

The cure may be continued several times as long without bad effects and the vulcanization may be carried out in open air or steam with equally good results. The time of cure is of course dependent on the thickness of the rubber and will vary with different kinds of stock. This accelerator is however particularly active and vulcanization is quickly obtained and a stock produced which has excellent tensile properties and very little odor.

Thiobenzoyldisulphide has the formula

The method of preparation of thiobenzoyldisulphide employed is a standard method found in the literature and known as the Grignard reaction. In general the method consists in dissolving brombenzol in dry ethyl ether and the solution is treated with magnesium turnings. After completion of the reaction carbon bisulphide is added and the solution thus obtained is treated with water. The solution is extracted with ether and the ether solution is extracted with sodium carbonate solution in water. This water solution which contains a sodium salt and dithiobenzoic acid is treated with iodine as an oxidizing agent whereupon the thiobenzoyldisulphide crystallizes and is recovered.

Vulcanization at a low temperature may be accomplished by mixing 100 parts of rubber, 10 parts of zinc oxide, 3 parts of sulphur, 3 parts of thiobenzoyldisulphide and 2 parts of paratoluidine. The mixture is allowed to remain at ordinary room temperature for one week or less whereupon a satisfactory vulcanization is effected.

By varying the accelerator and the amine various results may be produced and the temperature necessary for vulcanization may be likewise varied. In the case of some of the accelerators of this class low temperature vulcanization or vulcanization at a temperature below that of the normal hot vulcanization, may be accomplished without the aid of an amine. It will be apparent that when low temperature vulcanization is carried out with the aid if the several members of the class, the proportions of the example just given may be varied to suit the requirements of the particular case and the stock to be treated. By the term low temperature is meant temperatures below the normal hot vulcanization temperature and ranging say from room temperature or lower preferably to nearly 240° F.

The above accelerator is a preferred member of a group of compounds which are able to produce approximately equally good results when added as accelerators in vulcanizing rubber. Other members of this group are:

Thiophenylacetyldisulphide

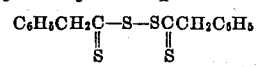

Thioacetyldisulphide

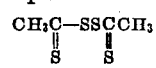

*Species 22.*

The following members of this species have been employed to give good results in connection with the process included in the invention:—

Acetyldisulphide

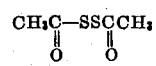

Benzoyldisulphide

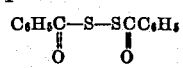

*Species 25.*

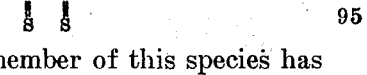

The following member of this species has been employed to give good results in connection with the process included in the invention:

Dibutylthiolester of thioncarbonyldisulphide

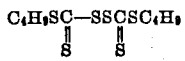

*Species 29.*

Members of this class include:
Dimethyldiphenylthiuramdisulphide

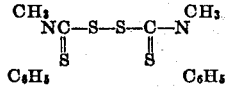

Diethyldiphenylthiuramdisulphide

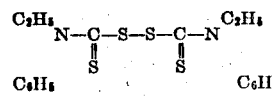

Diparamethylphenylenedimethylthiuramdisulphide

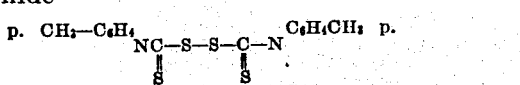

The above members were disclosed and claimed in my copending application Serial No. 374,275, filed April 16, 1920, and now appear in my copending application Serial No. 424,456, now issued as Patent No. 1,445,621 filed November 16, 1920.

*Species 30.*

The following member of this species has been employed to give good results in connection with the process included in the invention:—

Tetraethylcarbamyldisulphide

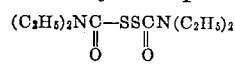

Other similar disulphides containing other aryl or equivalent groups will also accelerate vulcanization in a similar manner, but these accelerators will naturally vary in their effects according to the nature of the aryl or similar groups and they may be selected for the requirements of a particular case.

It is to be understood that rubber substitutes, synthetic rubber balata, gutta percha, etc., may be similarly treated instead of rubber and it is intended to cover such processes in the claims.

By the use of the accelerators of this group vulcanization is accomplished in a rapid and efficient manner without burning and prevulcanization on the mill, and rubber products are produced having a high tensile strength, and good ageing qualities. Some of the products have a sweet odor. The fact that many of the members of the group are oily substances renders their addition on the mill an easy operation and results in a very uniform and efficient mixture. The raw materials from which the accelerators are prepared are moreover cheap and the process of manufacture simple.

A particular merit of these accelerators is that they will effect cold vulcanization and that they will do so without regenerating an acid which is an advantage not possessed by sulphur chloride, for this agent generates hydrochloric acid. They may be added directly to the compounding ingredients on the mill, which is also impracticable with sulphur chloride.

The accelerators of this group may be employed generally in vulcanization in thick or thin masses of rubber or in cements. It has been found that non-nitrogenous accelerators of this group effect vulcanization at ordinary temperatures more readily than nitrogenous accelerators of this group. It will thus be seen that among others the objects of the invention above enumerated are achieved.

It will be understood that the invention disclosed in copending application Serial No. 441,691, filed February 1, 1921, may be employed in connection with the accelerators disclosed and included in the invention of the present application. Although described herein no other species is claimed except those in the set made up of species 21, 22, 23 and 24.

As many apparently widely different embodiments of this invention may be made without departing from the spirit thereof, it will be understood that I do not intend to limit myself to the specific embodiment herein set forth except as indicated in the appended claims.

Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent, and an accelerator comprising the radical

and vulcanizing the rubber.

2. A process of vulcanizing rubber or similar material which comprises combining with the rubber a vulcanizing agent, and an accelerator comprising the radical

in the presence of a combined metal M′, and vulcanizing the rubber.

3. A process of vulcanizing rubber or similar material which comprises combining with the rubber a vulcanizing agent and an accelerator comprising the radical

and vulcanizing the rubber.

4. A process of vulcanizing rubber or similar material which comprises combining with the rubber a vulcanizing agent and an accelerator comprising the radical

in the presence of a combined metal M′, and vulcanizing the rubber.

5. A process of vulcanizing rubber or similar material which comprises combining with the rubber a vulcanizing agent, and an accelerator comprising the radical

and an amine, and vulcanizing the rubber.

6. A process of vulcanizing rubber or similar material which comprises combining with the rubber a vulcanizing agent, and an accelerator comprising the radical

and an amine, in the presence of a combined metal M', and vulcanizing the rubber.

7. A process of vulcanizing rubber or similar material which comprises combining the rubber with a vulcanizing agent and an accelerator comprising the radical

and an amine having a replaceable ammoniacal hydrogen, and vulcanizing the rubber.

8. A process of vulcanizing rubber or similar material which comprises combining the rubber with a vulcanizing agent and an accelerator comprising the radical

and an amine having a replaceable ammoniacal hydrogen in the presence of a combined metal M', and vulcanizing the rubber.

9. A process of vulcanizing rubber or similar material which comprises combining the rubber with a vulcanizing agent, thiobenzoyldisulphide, an amine, and a combined metal M', and vulcanizing the rubber.

10. A process of vulcanizing rubber or similar material which comprises combining the rubber with sulphur, thiobenzoyldisulphide, zinc oxide, and paratoluidine, and vulcanizing the rubber.

11. A process of vulcanizing rubber or similar material which comprises combining the rubber with sulphur, thiobenzoyldisulphide, an amine, and combined zinc, and vulcanizing the rubber.

12. A process of vulcanizing rubber or similar material which comprises combining the rubber with approximately 3 parts of sulphur, approximately 1/10 part of thiobenzoyldisulphide, approximately 10 parts of zinc oxide, and vulcanizing the rubber with the application of heat.

13. A process of vulcanizing rubber or similar material which comprises combining the rubber with a vulcanizing agent and an accelerator comprising the radical

in the presence of a combined metal M', and vulcanizing the rubber at a temperature below the normal hot vulcanizing temperature.

14. A process of vulcanizing rubber or similar material which comprises combining with the rubber a vulcanizing agent, and an accelerator comprising the radical

and an amine, and vulcanizing the rubber at a temperature below the normal hot vulcanizing temperature.

15. A process of vulcanizing rubber or similar material which comprises combining the rubber with a vulcanizing agent, thiobenzoyldisulphide, an amine, and a combined metal M', and vulcanizing the rubber at a temperature below the normal hot vulcanizing temperature.

16. A process of vulcanizing rubber or similar material which comprises combining the rubber with sulphur, thiobenzoyldisulphide, zinc oxide, and paratoluidine, and vulcanizing the rubber at a temperature below the normal hot vulcanizing temperature.

17. A process of vulcanizing rubber or similar material which comprises combining with the rubber a vulcanizing agent and an accelerator comprising the radical

and vulcanizing the rubber at a temperature below the normal hot vulcanizing temperature.

18. A process of vulcanizing rubber or similar material which comprises combining with the rubber a vulcanizing agent and an accelerator comprising the radical

in the presence of a combined metal M', and vulcanizing the rubber at a temperature below the normal hot vulcanizing temperature.

19. A process of vulcanizing rubber or similar material which comprises combining with the rubber a vulcanizing agent comprising the radical

and an amine having a replaceable ammoniacal hydrogen, and vulcanizing the rubber at a temperature below the normal hot vulcanizing temperature.

20. A process of vulcanizing rubber or similar material which comprises combining with the rubber a vulcanizing agent comprising the radical

and an amine having a replaceable ammoniacal hydrogen, in the presence of a combined metal M', and vulcanizing the rubber at a temperature below the normal hot vulcanizing temperature.

21. A process of vulcanizing rubber or similar material which comprises combining the rubber with sulphur, thiobenzoyldisulphide, an amine and combined zinc, and vulcanizing the rubber at a temperature below the normal hot vulcanizing temperature.

22. A process of vulcanizing rubber or similar material which comprises combining with the rubber about 10 parts of zinc oxide, 3 parts of sulphur, 3 parts of thiobenzoyldisulphide, 2 parts of para toluidine, and vulcanizing the rubber at a temperature below the normal hot vulcanizing temperature.

23. A vulcanized rubber derived from rubber or similar material combined with a vulcanizing agent, and an accelerator comprising the radical

24. A vulcanized rubber derived from rubber or similar material combined with a vulcanizing agent, and an accelerator comprising the radical

in the presence of a combined metal M'.

25. A vulcanized rubber derived from rubber or similar material combined with a vulcanizing agent and an accelerator comprising the radical

26. A vulcanized rubber derived from rubber or similar material combined with a vulcanizing agent and an accelerator comprising the radical

in the presence of a combined metal M'.

27. A vulcanized rubber derived from rubber or similar material combined with a vulcanizing agent, and an accelerator comprising the radical

and an amine.

28. A vulcanized rubber derived from rubber or similar material combined with a vulcanizing agent, and an accelerator comprising the radical

and an amine, in the presence of a combined metal M'.

29. A vulcanized rubber derived from rubber or similar material combined with a vulcanizing agent and an accelerator comprising the radical

and an amine having a replaceable ammoniacal hydrogen.

30. A vulcanized rubber derived from rubber or similar material combined with a vulcanizing agent and an accelerator comprising the radical

and an amine having a replaceable ammoniacal hydrogen in the presence of a combined metal M'.

31. A vulcanized rubber derived from rubber or similar material combined with a vulcanizing agent, thiobenzoyldisulphide, an amine, and a combined metal M'.

32. A vulcanized rubber derived from rubber or similar material combined with sulphur, thiobenzoyldisulphide, zinc oxide, and paratoluidine.

33. A vulcanized rubber derived from rubber or similar material combined with sulphur, thiobenzoyldisulphide, an amine, and combined zinc.

34. A rubber vulcanized at a temperature below the normal hot vulcanizing temperature derived from rubber or similar material combined with a vulcanizing agent and an accelerator comprising the radical

in the presence of a combined metal M'.

35. A rubber vulcanized with the application of heat derived from rubber or similar material combined with approximately 3 parts of sulphur, approximately 0.1 part of thiobenzoyldisulphide, and approximately 10 parts of zinc oxide.

36. A rubber vulcanized at a temperature below the normal hot vulcanizing temperature derived from rubber or similar material combined with a vulcanizing agent, and an accelerator comprising the radical

and an amine.

37. A rubber vulcanized at a temperature below the normal hot vulcanizing temperature derived from rubber or similar material combined with a vulcanizing agent, thiobenzoyldisulphide, an amine, and a combined metal M'.

38. A rubber vulcanized at a temperature below the normal hot vulcanizing temperature derived from rubber or similar material combined with sulphur, thiobenzoyldisulphide, zinc oxide, and paratoluidine.

39. A rubber vulcanized at a temperature below the normal hot vulcanizing temperature derived from rubber or similar material combined with a vulcanizing agent and an accelerator comprising the radical $$\text{OCSSCC.}$$
$$\phantom{OC}\downarrow\phantom{SS}\downarrow$$
$$\phantom{OCSS}X\phantom{SS}X$$

40. A rubber vulcanized at a temperature below the normal hot vulcanizing temperature derived from rubber or similar material combined with a vulcanizing agent and an accelerator comprising the radical $$\text{OCSSCC}$$
$$\phantom{OC}\downarrow\phantom{SS}\downarrow$$
$$\phantom{OCSS}X\phantom{SS}X$$

in the presence of a combined metal M'.

41. A rubber vulcanized at a temperature below the normal hot vulcanizing temperature derived from rubber or similar material combined with a vulcanizing agent comprising the radical $$\text{OCSSCC,}$$
$$\phantom{OC}\downarrow\phantom{SS}\|$$
$$\phantom{OCSS}X\phantom{SS}X$$

and an amine having a replaceable ammoniacal hydrogen.

42. A rubber vulcanized at a temperature below the normal hot vulcanizing temperature derived from rubber or similar material combined with a vulcanizing agent comprising the radical $$\text{OCSSCO}$$
$$\phantom{OC}\downarrow\phantom{SS}\downarrow$$
$$\phantom{OCSS}X\phantom{SS}X$$

and an amine having a replaceable ammoniacal hydrogen, in the presence of a combined metal M'.

43. A rubber vulcanized at a temperature below the normal hot vulcanizing temperature derived from rubber or similar material combined with sulphur, thiobenzoyldisulphide, an amine and combined zinc.

44. A rubber vulcanized at a temperature below the normal hot vulcanizing temperature derived from rubber or similar material combined with about 10 parts of zinc oxide, 3 parts of sulphur, 3 parts of thiobenzoyldisulphide, 2 parts of paratoluidine.

Signed at New York, New York, this 30th day of March, 1922.

SIDNEY M. CADWELL.